United States Patent [19]

Miller

[11] Patent Number: 4,893,071
[45] Date of Patent: Jan. 9, 1990

[54] CAPACITIVE INCREMENTAL POSITION MEASUREMENT AND MOTION CONTROL

[75] Inventor: Gabriel L. Miller, Westfield, N.J.

[73] Assignee: American Telephone and Telegraph Company, AT&T Bell Laboratories, Murray Hill, N.J.

[21] Appl. No.: 197,800

[22] Filed: May 24, 1988

[51] Int. Cl.[4] .................... G01B 7/30; G08C 19/10
[52] U.S. Cl. .................... 324/660; 324/686; 324/688; 340/870.37
[58] Field of Search ............... 340/870.37; 324/61 R, 324/61 P

[56] References Cited

U.S. PATENT DOCUMENTS

| Re. 27,436 | 7/1972 | Sawyer . | |
|---|---|---|---|
| 3,593,115 | 7/1971 | Dym | 340/870.37 |
| 3,784,897 | 1/1974 | Norrie | 340/870.37 |
| 3,860,918 | 1/1975 | Cencel | 340/870.37 |
| 3,961,318 | 6/1976 | Farrand | 340/870.37 |
| 4,404,560 | 9/1983 | Williams | 340/870.37 |
| 4,420,754 | 12/1983 | Andermo | 340/870.37 |
| 4,654,571 | 3/1987 | Hinds . | |
| 4,654,581 | 3/1987 | Neukermans | 340/870.37 |
| 4,733,235 | 3/1988 | Baer | 324/61 P |
| 4,743,838 | 5/1988 | Eckerle | 324/61 P |

FOREIGN PATENT DOCUMENTS

| 2017188 | 8/1971 | Fed. Rep. of Germany | 340/870.37 |
|---|---|---|---|
| 2139359 | 11/1984 | United Kingdom | 340/870.37 |

OTHER PUBLICATIONS

"The Design and Application of Capacitance Micrometers" by R. V. Jones and J. C. S. Richards, Journal of Physics E, Science Instruments, vol. 6, Series 2, 1973, pp. 589–600.
"The Precise Measurement of Small Capacitances" by A. M. Thompson, IRE Transactions on Instrumentation, vol. 1–7, 1958, pp. 245–253.

Primary Examiner—Reinhard J. Eisenzopf
Assistant Examiner—Jose M. Solis
Attorney, Agent, or Firm—William Ryan

[57] ABSTRACT

A capacitance based, high resolution, incrementally encoding, position measuring system employs an array of identical replicated electrodes that are driven in unison from an RF source and mounted in proximity to a patterned monolithic reference ground plane of arbitrary size. Motion of such position-sensing arrays is monitored by measuring both the sums and the differences of the electrode displacement currents in such a way as to provide incrementally encoding position signals in both one and two dimensions together with a continuous measurement of the height of the sensor array above the patterned ground plane. In various modifications, the system and methods are applied both to one dimensional linear, as well as to two dimensional planar and two dimensional cylindrical motion measurement and control. Various techniques for eliminating the effects of spurious capacitances are also disclosed.

29 Claims, 14 Drawing Sheets

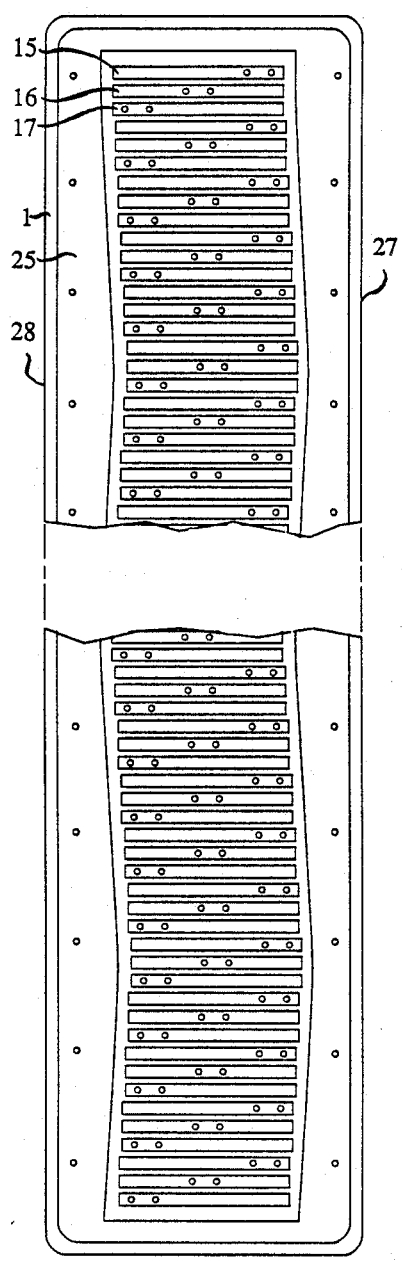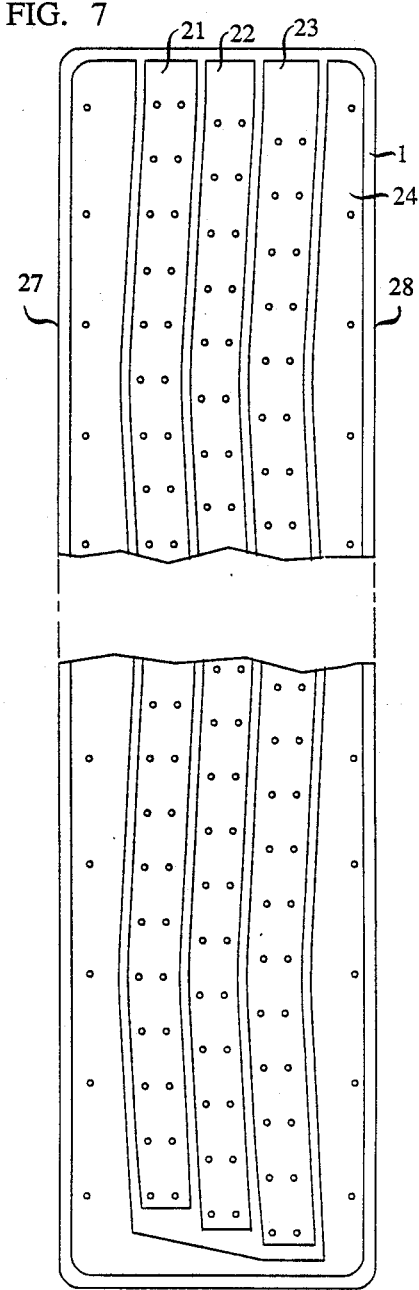

CAPACITIVE INCREMENTAL POSITION MEASUREMENT AND MOTION CONTROL

FIELD OF THE INVENTION

This invention relates to capacitive position measurement and motion control, particularly the precision measurement of the position of one element with respect to another, in both one and two dimensions, including systems such as those employing two dimensional air bearings.

BACKGROUND OF THE INVENTION

Numbers of mechanical positioning systems requiring the highest available accuracy utilize air bearings, to minimize friction and backlash effects, together with laser interferometers to determine position as proposed for example by Hinds in U.S. Pat. No. 4,654,571. However such interferometer systems are of necessity costly and complex and exhibit further difficulties if it is desired to position several such elements independently in a common working area. This latter problems arises due to the inevitable mutual blocking of the multiple independent measuring light beams for some relative positions of the moving elements. The need for such multiple independent elements can arise, for example, in certain types of high precision automated fabrication and assembly applications.

An attractive alternative approach would be to arrange that each moving element be capable of determining its own position directly, in two dimensions, relative to a patterned working surface over which it moved. Suitable patterns arise automatically if two-dimensional actuators of the type initially proposed by Sawyer in U.S. Pat. No. Re 27,436 are employed. However, no prior method exists for measuring position accurately, rapidly and at low cost over large working regions for such actuators or, indeed for any multiple independent moving elements.

In other contexts, capacitive transducers are known to be advantageous. The use of capacitive transducers for distance measurement is an established technique, and is capable of providing exceedingly high resolution as discussed by R. V. Jones and J. C. S. Richards, "The Design and Application of Capacitance Micrometers", Journal of Physics E, Science Instruments, Vol. 6 Series 2, 1973, pp. 589–600, and A. M. Thompson, "The Precise Measurement of Small Capacitances", IRE Transactions on Instrumentation, Vol. 1-7, 1958, pp. 245–253. This high sensitivity is inherent and derives in the last resort from the fact that capacitors themselves generate no noise. Such capacitive methods are well known and have even been extended to provide digital linear encoder designs for one dimensional transverse motion as exemplified by Andermo in U.S. Pat. No. 4,420,754.

However, the prior methods are inapplicable to the present case which is new and different in four important respects. First, the position encoder needs to be truly two dimensional, reading out either or both the X and Y position simultaneously with orthogonal independence, i.e., translation in X not affecting the Y readout and conversely. Second, the position measurement system must not require the use of any special wiring, interconnections or electrically floating electrodes associated with the platen itself. Third, the outer information needs to be independent of electrode spacing and any associated "roll", "pitch" or "yaw" of the sensor. And finally the sensor needs to be of sufficiently large area that it averages over hundreds, if not thousands, of substrate posts. (This last requirement relieves the need for unreasonable demands being placed on the post-to-post uniformity of the platen for high positioning accuracy.) Additional desiderata are low sensor fabrication cost, fast response, independent height readout (indicating instantaneous air bearing thickness) and simple associated readout electronics.

SUMMARY OF THE INVENTION

The present invention addresses this problem directly by referring the motion to a uniformly repeated two-dimensional symmetrical pattern impressed on the working surface and examining this pattern capacitively. The patterned substrate, or "platen", can consist of a uniform two-dimensional array of either posts or holes in either a conducting or an insulating surface. In the system proposed here, the element moving over this surface (supported for example on an air bearing) determines its position by making continuous multiple capacitive measurements to the substrate itself. The method, which uses the foregoing spatially modulated capacitive effect, extends directly to linear, planar, rotational and cylindrical position measurement and motion control.

All of the foregoing requirements are met by the repetitively patterned multiple-capacitive-sensor system proposed here. The first multiple-electrode sensor reads out motion incrementally in only the one desired direction, with essential independence from all five of the remaining (unwanted) degrees of freedom. A second multiple-electrode sensor, orthogonal to the first, provides a simultaneous and independent Y readout. Preferably, both sensors provide both digital incremental position encoding and high resolution position interpolation, assisted by a preferred three-phase read-out technique and a "chevron" printed circuit implementation of the multiple electrodes.

The same scheme extends directly to position readout on a right circular cylinder instead of a plane, and extends even more simply to the one dimensional case of purely linear or rotary motion. Indeed, in the latter rotational case the automatic ability of this approach to sense the motion simultaneously for all the "teeth" around the complete 360° circle provides the desirable attribute of high differential linearity at relatively low cost.

According to a primary feature of the invention the position of an object with respect to a replicated patterned array of identical elements is determined by a capacitive effect which is spatially modulated in each desired direction of measurement. This is achieved in the two-dimensional case by the use of two respective photolithographically fabricated "chevron" arrays of multiple identical electrodes, each composed of conducting elements spaced apart in a respective direction of measurement, all of which are driven in unison through a common 1:1:1:1 transformer. This electrode array can move with respect to a closely spaced, electrical ground plane associated with, or including, the patterned substrate. Both lateral position and spacing information are derived simultaneously by synchronous detection of both the sums and the differences of the RF displacement currents flowing to the separate elements of the electrode structure. The RF amplitude itself is servo-stabilized in such a way as to compensate for spacing variations as the sensor moves, while continuously reading out both the spacing and the lateral position information.

An important attribute of each array arrangement of conducting elements is that it reads out position information in only the one (desired) direction, while remaining essentially insensitive to motion in the transverse (undesired) direction. It is this feature that allows two such arrays of conducting elements to be mounted at right angles to one another and thereby provide high resolution position information in two dimensions simultaneously while the sensor moves over a 2D ground plane of arbitrary size. The resolution, and interpolative, capability are aided by appropriate choices of the periodicities of the array, on one hand, and of the patterned substrate, on the other hand.

Other features of the invention are that the measurement is largely unaffected by small angular motions ("roll", "pitch" and "yaw") of the sensor, as well as spacing variations, such as are virtually unavoidable with the use of air bearings. These desirable properties arise from the highly interdigitated chevron array geometry employed, together with the exceedingly uniform driving voltage applied to each electrode, (i.e., each conducting element), through the use of a multifilar transformer and servo-stabilization of the sum total of the electrode displacement currents.

Another important attribute of the approach is that it lends itself naturally to the use of very large electrode arrays, at almost no additional cost. This property provides an automatic and continuous averaging effect over nonuniformities and "spatial noise" in both the patterned ground plane and the position measuring electrode structure itself. As such the system is capable of providing high differential linearity in the position measurement. This can be important in controlling the tool or workpiece that is typically mounted on, or is a part of, the same moving member as the electrode array or arrays.

It should be clear that position measurement according to the invention is not limited to a factory environment, but has applications wherever the position of an object must be precisely known.

Additional observations are that the method extends directly to two-dimensional position measurement on cylindrical surfaces, and also applies to both one dimensional linear and one dimensional rotational measurements, where it exhibits a number of added advantages.

The method can be applied in two different situations, depending on whether the patterned electrode is electrically grounded or alternatively can itself be intentionally driven with RF. In the former case the multifilar transformer driving scheme is advantageous and constitutes the method of choice. In the latter case the patterned base electrode (or an electrode behind it) can advantageously itself be driven with RF instead of using the series transformer.

A qualitatively different feature of the use of capacitive sensors for position determination (as distinct from some type of magnetic sensors, for example) is their inherently high measurement speed. This stems directly from the fact that they operate at ratio frequencies and can therefore readily provide fast response. Such fast response is particularly advantageous for numbers of motion control applications involving very fine-toothed variable reluctance motors which require high commutation frequencies if they are to move at high speeds. These and further features of the invention will become apparent from the following detailed description and the drawing.

BRIEF DESCRIPTION OF THE DRAWING

FIGS. 6 and 7 are a top and bottom views, respectively of an actual chevron printed circuit capacitive sensor designed to span seven platen periods transversely and a much larger number of periods longitudinally, to provide a high degree of spatial averaging.

DETAILED DESCRIPTION

Figure 1:
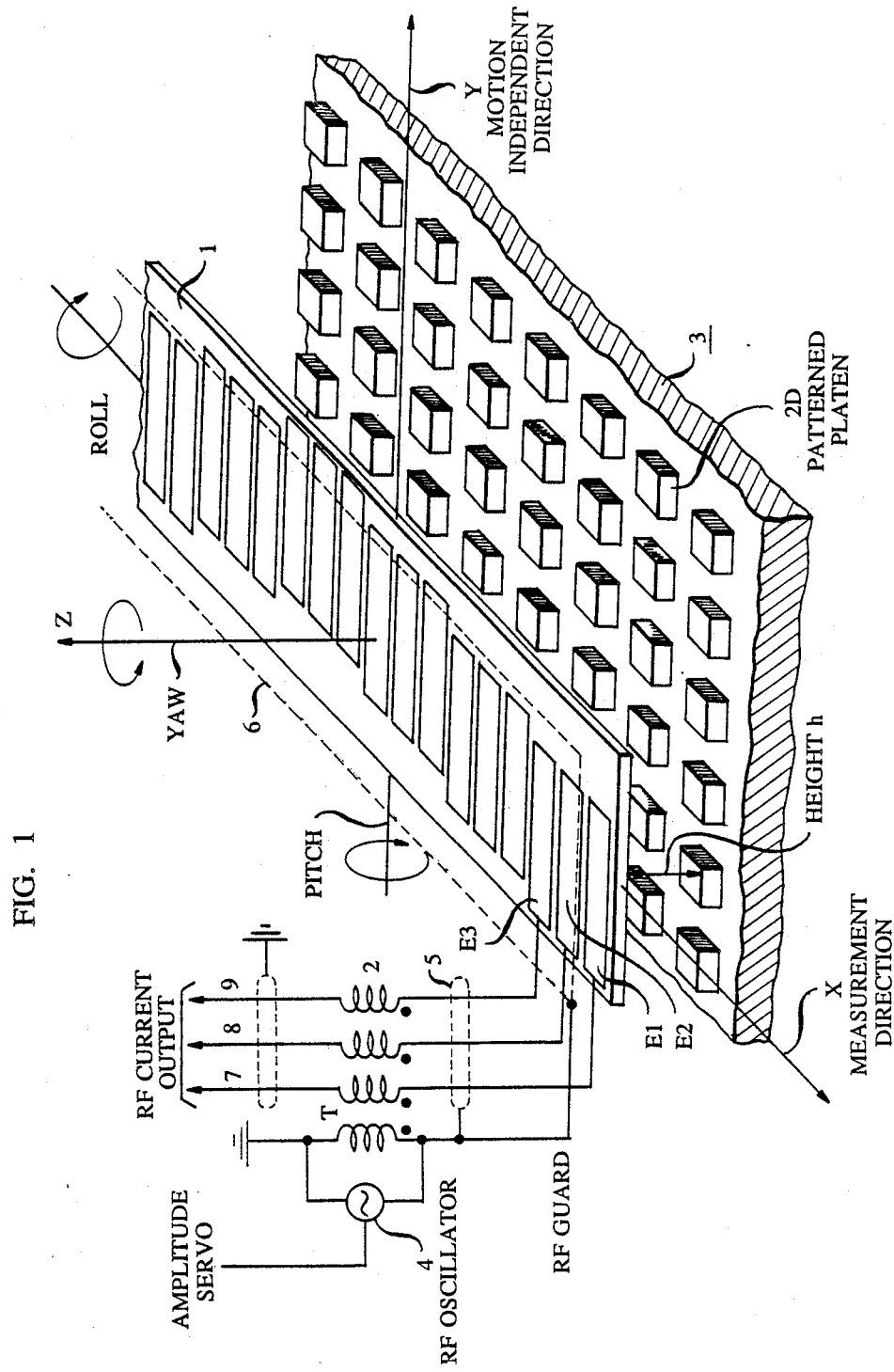
FIG. 1 is a composite view of a chevron capacitive sensor, driven by a quadrifilar transformer, being used for position measurement in one direction on a two-dimensional platen.

The basis of the capacitive position measuring system can be understood by reference to FIG. 1. Here a sensing electrode array 1 is connected to a quadrifilar 1:1:1:1 transformer 2 and is situated a small distance h above a patterned and electrically grounded platen 3. The transformer 2 is driven by an RF oscillator 4, operated at a frequency in the range from 100 kHz to 100 MHz; and the connections are such that all of the triples of replicated sensor electrodes E1, E2, E3 are voltage driven in unison, i.e., all the sensing electrodes always move together electrically with exactly the same amplitude and phase. By virtue of this arrangement it is simple to shield the sensor electrodes E1, E2, E3 from unwanted stray capacitances to ground by driving the cable braid 5 and sensor electrostatic shield 6 directly from the primary of the 1:1:1:1 transformer. In this way the RF current outputs 7, 8 and 9, which all three flow into virtual grounds, are themselves a measure of the RF currents flowing to the platen as a consequence of the capacitances of the electrodes E1, E2, E3 to ground.

These capacitances in turn are due in part to the overlap of the sensing electrodes 15, 16, 17 (shown in plan view above platen 3 in FIG. 2) with the platen posts. It is important to note that while the width of the sensing electrodes is illustratively equal to that of one post, their length is advantageously an integral number of posts-plus-valleys. In this way the overlap capacitance of any electrode to ground only changes as the sensor moves in the measurement direction and remains essentially unchanged for motions in the perpendicular direction.

Figure 2:
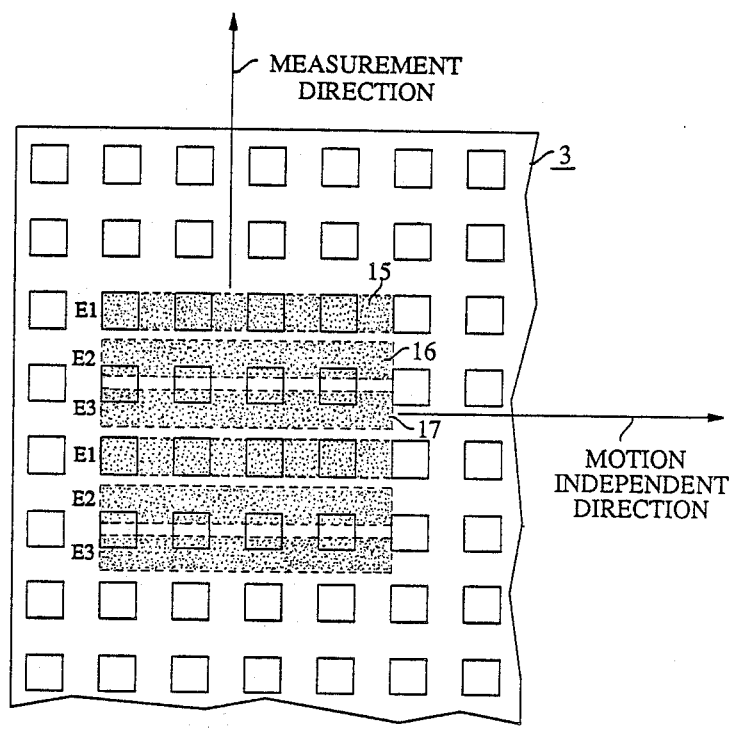
FIG. 2 is a plan view of two groups of three position sensing electrodes spanning exactly four transverse periods of the platen.
Figure 3:
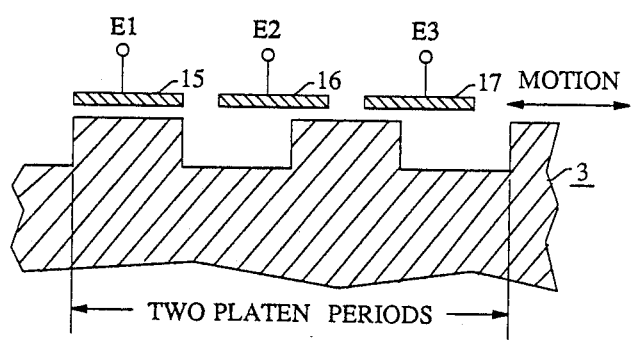
FIG. 3 is a side view of three pickup electrodes spanning precisely two periods of the platen in the measurement direction.

It is also evident in FIG. 2 that each measurement electrode triple E1, E2, E3, regardless of the individual widths, actually spans precisely two of the spatial periods of the platen, as indicated schematically in the side view of FIG. 3. Here the measurement electrodes 15, 16, 17 are seen situated just above two periods of the platen 3.

Figure 4:
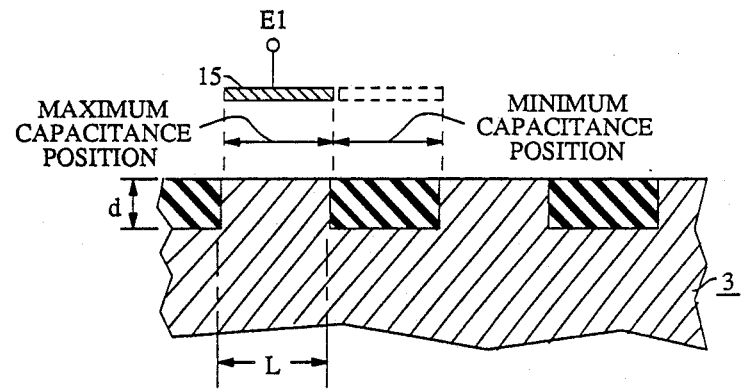
FIG. 4 is a diagram indicating the maximum and minimum capacitance positions of one representative electrode with respect to one platen period.

In practice the platen valleys are filled with an epoxy material (of dielectric constant k) since the platen surface needs to be extremely smooth so as to act as a small-clearance air bearing. Consequently the electrode-to-platen capacitance is modified, and furthermore of course the maximum and minimum capacitance values $C_{max}$ and $C_{min}$ actually correspond to a three-dimensional situation that includes significant fringing field effects. The position signals themselves derive in the last resort from the maximum to minimum capacitance ratios for a typical electrode, shown schematically in two positions in FIG. 4. For the currently implemented two dimensional systems the capacitance ratio can be shown to be approximated by $$\frac{C_{max}}{C_{min}} \simeq 1 + \frac{d}{3hk} = 1 + \Delta \quad (1)$$

Here d is the valley depth and the quantity $\Delta = d/3hk$ is the modulation index that ultimately produces the position signal. Its value for current systems is $\approx 0.2$ and it is advantageous to make it as large as is reasonably possible.

Figure 5:
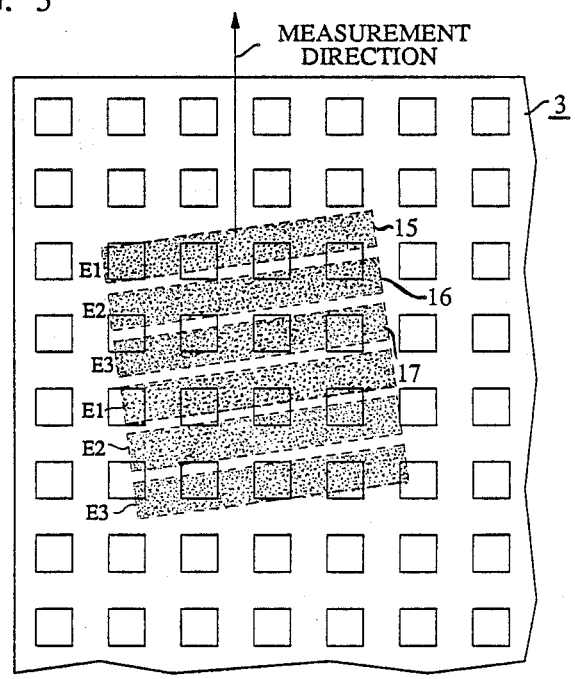
FIG. 5 is a plan view of a sensor electrode array that is tilted with respect to the platen structure.

It is also evident that in an air bearing situation it is possible for the electrode array shown in FIG. 2 to twist through some angle, as indicated in FIG. 5. From this, it is clear that for any sufficiently large rotation the sensor will ultimately become insensitive to linear motion since each electrode element will always overlap the new row of posts, etc. This demonstrates that for a given sensor area it is advantageous to arrange that the electrode structure be narrow in the motion direction and less extended in the perpendicular direction. This maximizes the range of angular motions that can be tolerated. The sensor must not be made too narrow, however, for fear of becoming excessively sensitive to transverse motions through spanning too few platen periods in that direction. Furthermore, of course, it is uneconomic to demand exceedingly stringent dimensional tolerances on the sensor electrode structure itself, since this is typically made by standard printed circuit board photolithographic techniques and as such is subject to over- or under-etching which can result in small and uncontrolled but significant variations in the sensor electrode lengths.

This problem in turn can be circumvented by arranging that the sensor electrodes are arranged in a serpentine or "chevron" pattern as indicated in FIGS. 6 and 7, which shows the front and back of a position sensor, the common edges thereof being 27 and 28, respectively. Use of this chevron technique in effect allows each E1, E2, E3 electrode triple 15, 16, 17 on the position sensor 1 to sample all possible positions within one transverse platen period. This, together with arranging that the length of each sensor electrode nominally span an integral number of posts-plus-valleys, renders the system highly insensitive to transverse motions.

Since it will be recalled from FIG. 1 that all the E1, E2, E3 electrodes move electrically exactly in unison it follows that their mutual capacitances are of no concern since they never experience any potential differences. Consequently it is convenient to arrange that all the electrode triples are appropriately connected (via redundant plated-through holes) to the three printed circuit buses 21, 22, 23 shown on the back of the printed circuit sensor 1 in FIG. 7. This actual sensor design uses 20 mil wide electrodes and spans 7 by 64 platen periods for a total of 448 platen elements. Assuming statistical spatial independence on the platen pattern this leads to a $\sqrt{448}$, (i.e., greater than twenty-fold), improvement in positioning accuracy over that obtainable by sensing single pattern elements.

Figure 8:
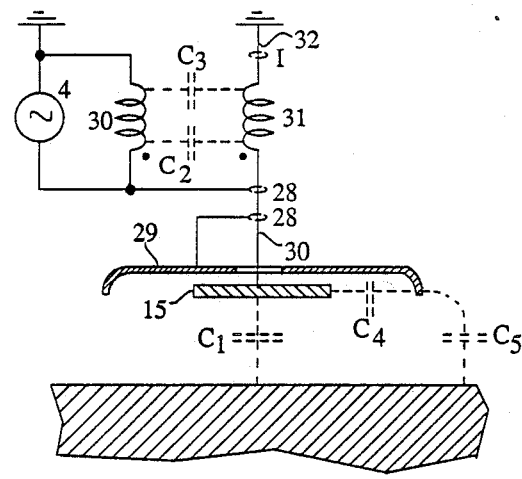
FIG. 8 is an exemplary self-guarded transformer-coupled readout scheme for one capacitive electrode situated above a uniform ground plane.

The operation of the specially developed self-shielding transformer coupled capacitance measuring scheme is shown (for the simplified case of just one electrode 15) in FIG. 8. Here the quantity of interest is the capacitance C1 to ground, and it is desired to measure this capacitance alone, independent of any interfering effects from any of the other capacitances. It will be noted that the use of a bifilar 1:1 transformer, with primary 30 and secondary 31, causes both dotted ends of the windings to move exactly in unison. Consequently no voltage difference occurs between the cable braid 28 and the cable core 30. Similarly, no voltage occurs between the electrode 15 and the electrostatic shield 29, so no RF current flows through the capacitor C4. Similarly negligible current flows through capacitors C2 and C3, in overlaid windings, since all the corresponding points on both windings move in unison. Of course, a large current flows through C5 to ground, but this current flows directly from the output of oscillator 4 and therefore does not appear in the secondary circuit of the transformer. As a result, the current I that flows into the (virtual) ground at 32 is a measure of the current flowing through C1 and through C1 alone. Referring back to FIG. 6 and FIG. 7, it will also be apparent that there are, in addition, two "window frame" electrodes 24 and 25 on each side of the chevron sensor. These two are electrically common and also driven from the oscillator 4 of FIG. 8 in common with electrostatic shield 29, to provide added RF shielding since they, too, move electrically exactly in unison with all the triples of sensing electrodes.

Figure 9:
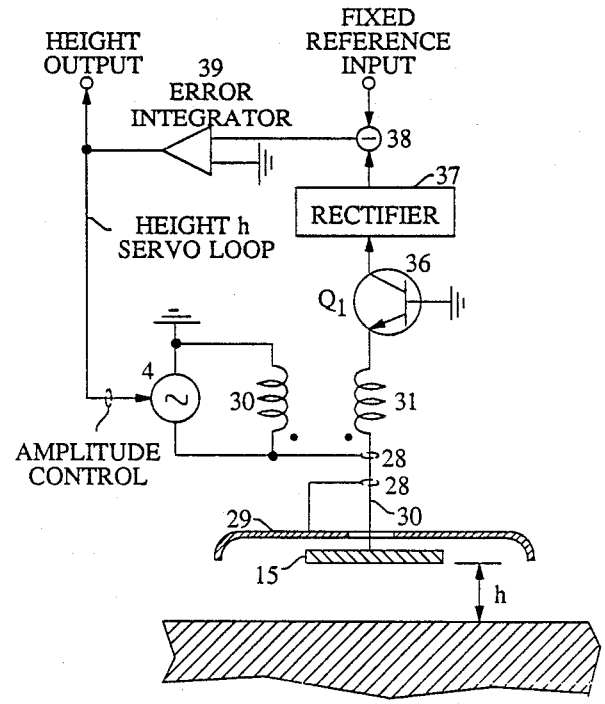
FIG. 9 is a simplified schematic showing the system that provides an output precisely proportional to the height h of an electrode above a flat ground plane.

A particular feature of the scheme shown in FIG. 8, and the main reason for its development for the present applications, is that it allows a simple and direct measurement of capacitances to ground. This by itself is useful, but it can be further extended to provide, in addition, the property of also measuring the spacing to ground in an inherently linear manner. (This is in sharp distinction to all prior capacitance v. distance methods which exhibit an inherently reciprocal relationship.) The method for achieving this is shown in FIG. 9.

Here, the undotted end of the transformer secondary 31 is connected to a virtual ground formed by the emitter of a grounded base transistor 36. (In this and all subsequent diagrams all transistor current and voltage biasing arrangements are omitted for clarity.) In this way the RF current flowing to ground from electrode 15 is rectified by 37 and subtracted from a fixed demanded value in 38. The residual difference between the two is then amplified by 39 and used to control the amplitude of the RF oscillator 4. In this way the RF amplitude itself is constantly servoed so as always to ensure that a constant displacement current is flowing from electrode 15 to ground. Since the impedance of 15 to ground is itself precisely proportional to the distance h (within the parallel plate capacitor approximation), it follows that the system output is inherently linear in distance, without the need of any corrections or the taking of any reciprocals.

Figure 10:
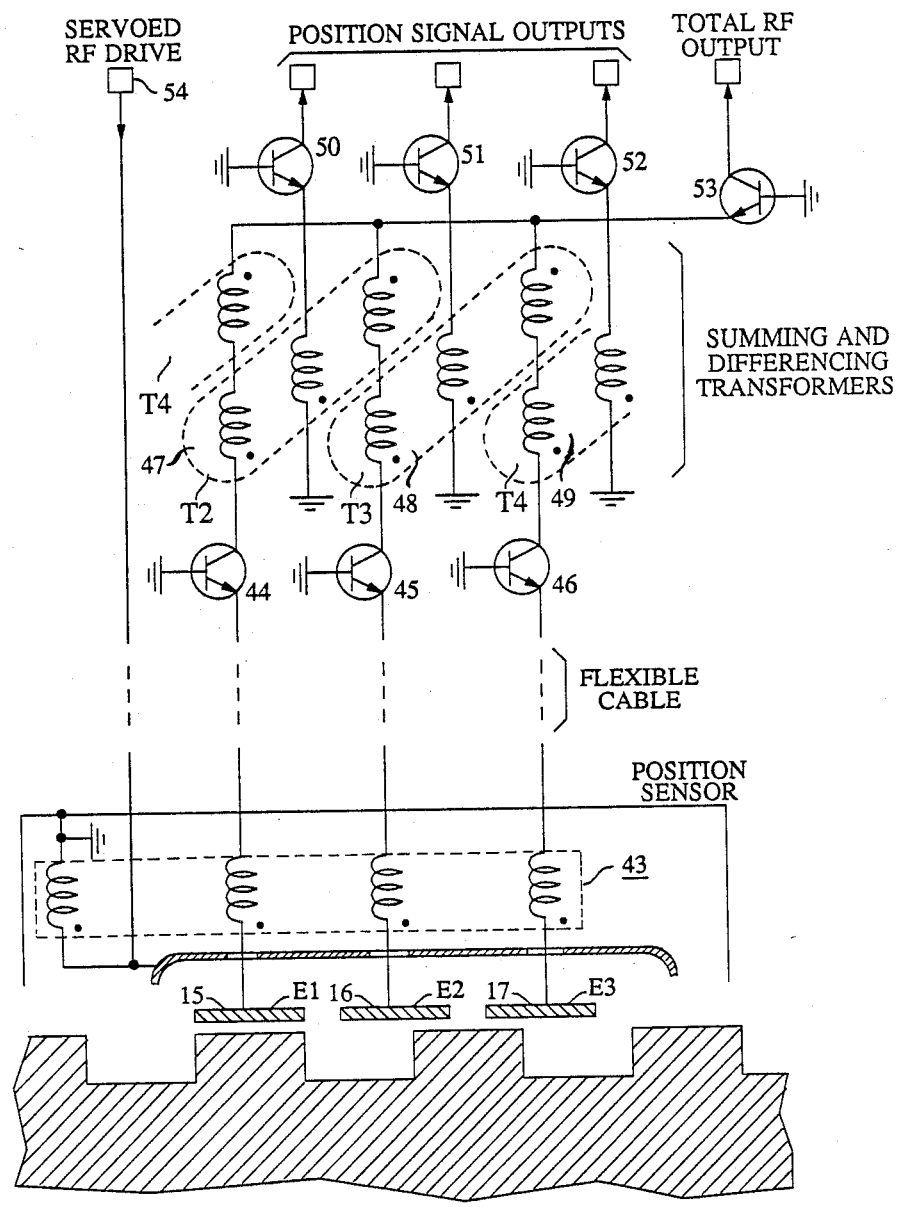
FIG. 10 illustrates the basic spatial three phase capacitive readout system showing the quadrifilar driving transformer and the summing and differencing transformer system.

This linear height measuring scheme is incorporated as an integral part of the chevron electrode positioning system as indicated in FIG. 10. Here the position sensing electrodes 15, 16, 17 are driven in unison by the 1:1:1:1 transformer 43, and the resulting RF currents flow through the grounded base stages 44, 45 and 46. Current differences are then formed passively (and very stably) by the 1:1:1 transformers T2, T3, T4, and thereby drive the grounded base stages 50, 51, 52. The outputs of these three transistors, in turn, constitute the RF current position information $\phi 1$, $\phi 2$, $\phi 3$. The sum total RF current flowing to all three electrode 15, 16, 17, on the other hand, is formed by summation at the emitter of 53, and is used to servo the amplitude of the RF drive 54 so as to provide the height output information as previously described in connection with FIG. 9.

A further virtue of this approach is that it provides excellent common-mode rejection in the transverse position signals themselves since they are formed by taking differences. This allows a substantial length of flexible cable to be employed, if desired, to couple the moving position sensor unit to the main system electronics without any problem from spurious pickup effects.

Figure 11:
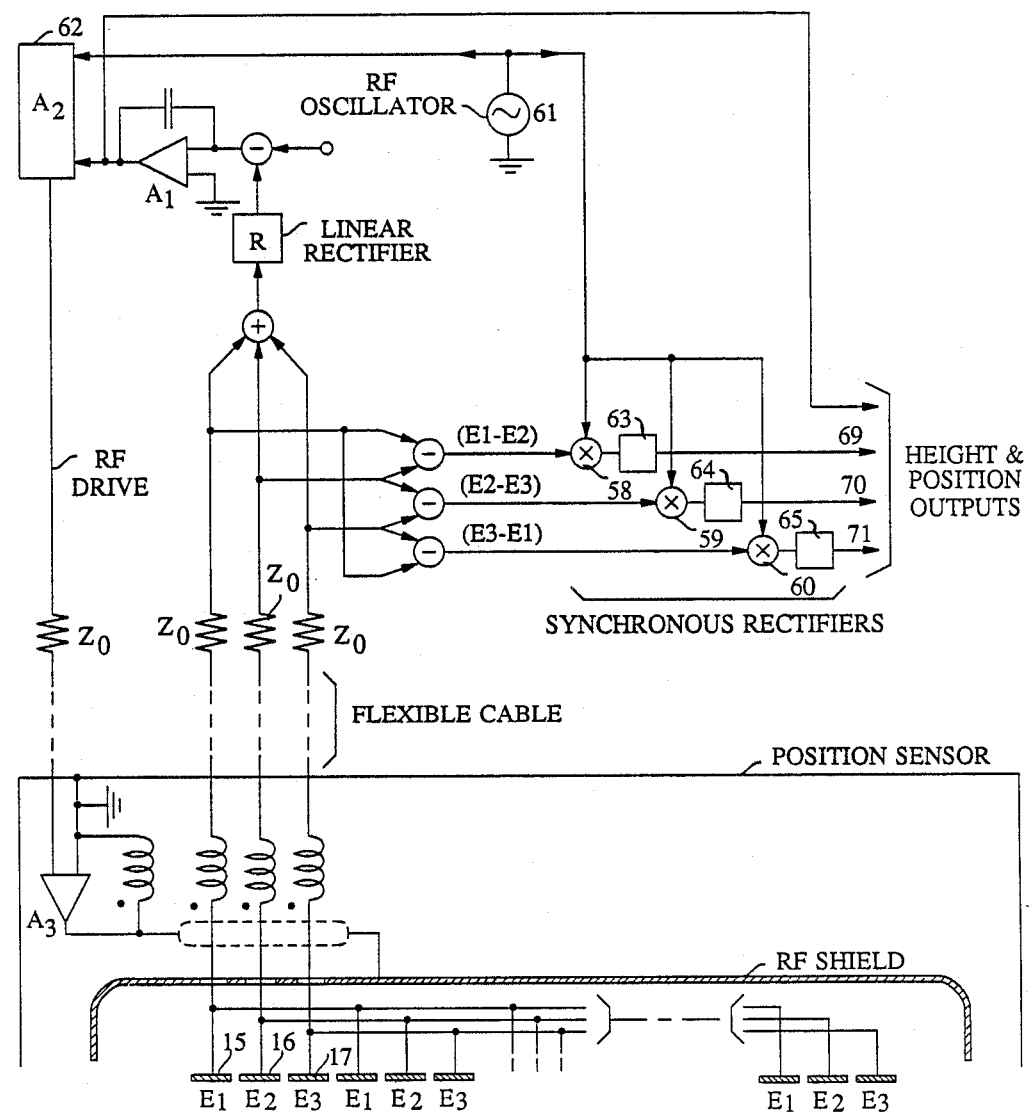
FIG. 11 is an overall schematic block diagram of the sensor system shown in FIG. 1, indicating both the height and the three-phase position outputs.

All of the preceding elements are combined to form a complete position and height sensing system as indicated in FIG. 11. The three (spatial) phase position outputs are formed by synchronous detectors 58, 59, 60, operating at the RF carrier frequency, and the RF filters 63, 64, 65. The RF drive itself is obtained from a common oscillator 61 (driving multiple independent position sensors for XY motion measurement) followed by a linear electronic attenuator 62. This, in turn, controls the servoed RF drive to electrodes 15, 16, 17, as previously described in connection with FIGS. 9 and 10.

Figure 12:
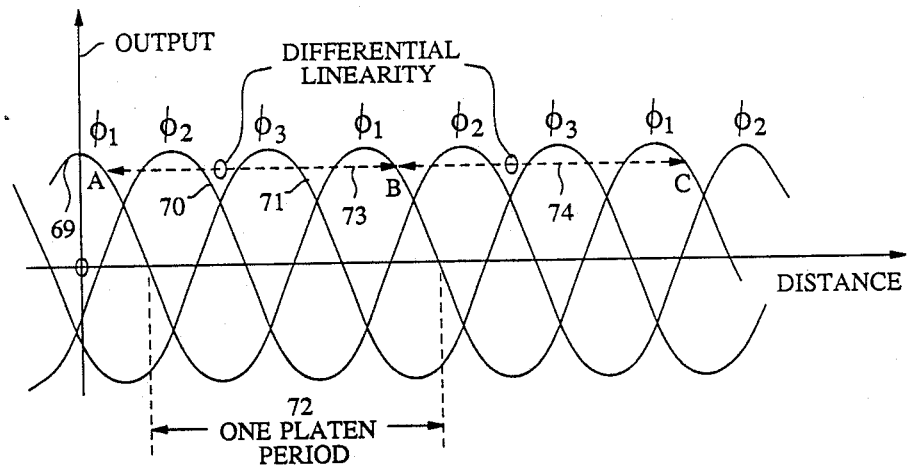
FIG. 12 is an illustration of the three phase position outputs $\phi 1$, $\phi 2$, $\phi 3$ and the significance of the sensor differential linearity.

The final output of this system consists of a signal representing the height h of the sensing electrode above the platen together with three essentially sinusoidal position signals 69, 70, 71 as shown in FIG. 12. These position signals in turn each span one platen spatial period 72, and are interleaved at 0°, 120° and 240° in the spatial domain. An important property of this system is that of high cycle-to-cycle reproducibility of each of the three position signals. This stems directly from the spatial averaging produced by the use of large electrode arrays of the type shown in FIG. 6. As a consequence the differential linearity is high, meaning that all distances such as 73 and 74 in FIG. 12 between corresponding segments such as AB and BC are essentially equal. (This is very important if it is desired to interpolate the position information accurately within each platen period.)

Figure 13:
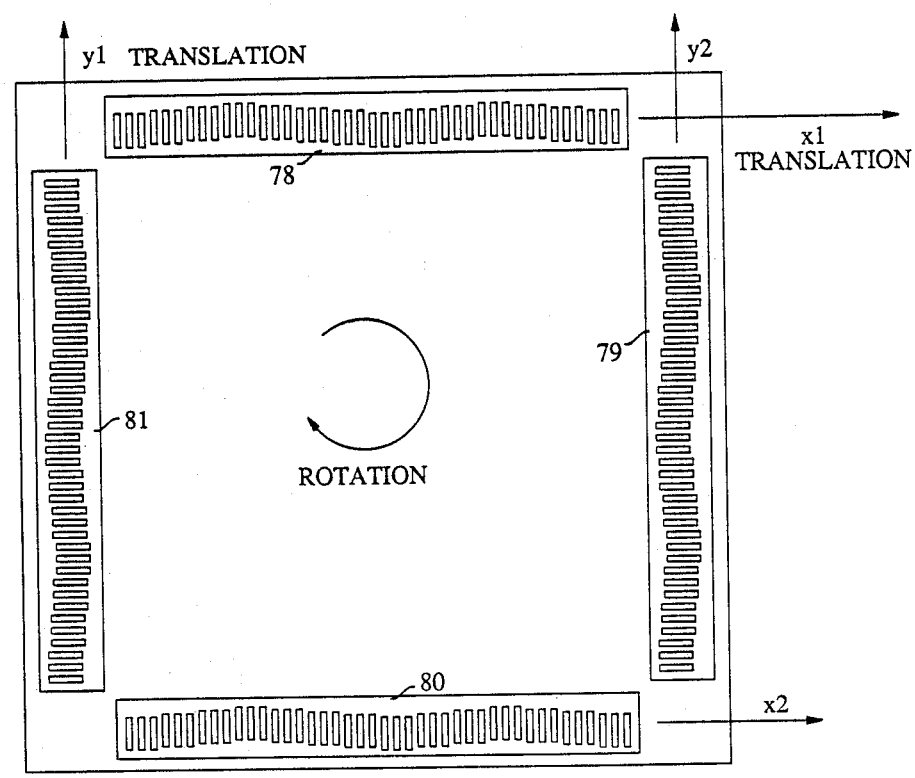
FIG. 13 illustrates the use of four chevron sensors mounted in a square to provide redundant two-dimensional position and angle readout in the plane.

A position measuring system of the kind so far described, can be applied in many different ways. One is to mount four such chevron sensors 78, 79, 80, 81 along the edges of a square, as shown in FIG. 13. This provides redundant X, Y, and angle readout for a two-dimensional actuator floating on an air bearing.

Figure 14:
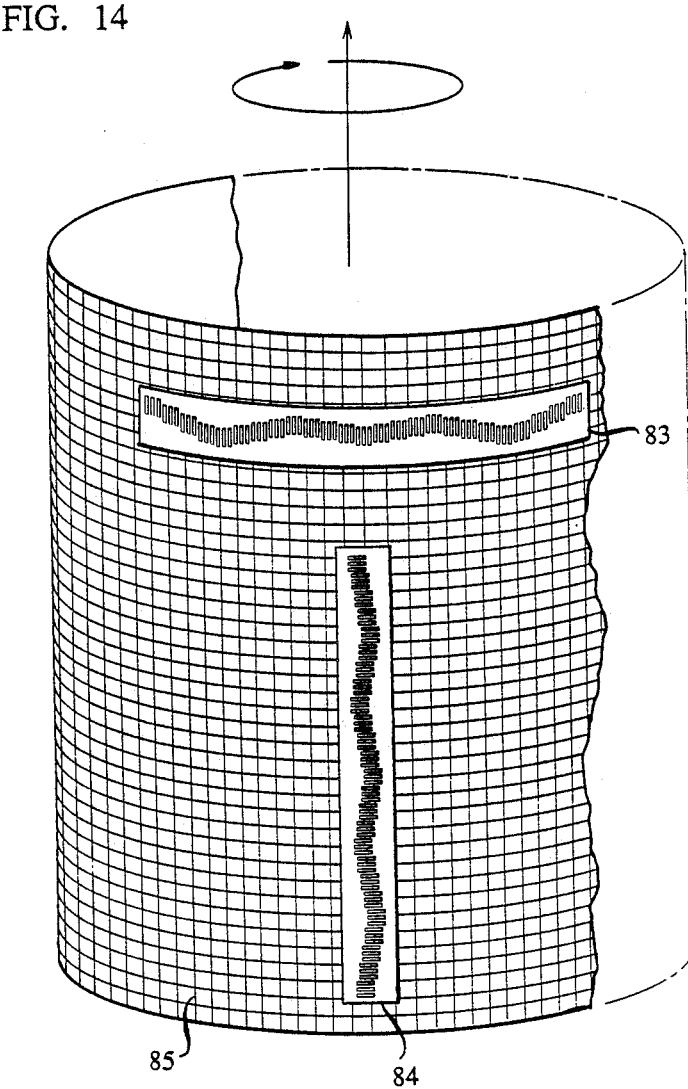
FIG. 14 illustrates the use of two curved chevron sensors to provide two-dimensional linear and angular displacement readout on a cylinder.

By the same token, the use of suitably curved sensors 83, 84 of the same type provides position readout on the surface of a cylinder 85 as indicated in FIG. 14. In both of these applications the use of the chevron sensor geometry provides a high degree of independence in the readout of the two separate degrees of freedom.

Figure 15:
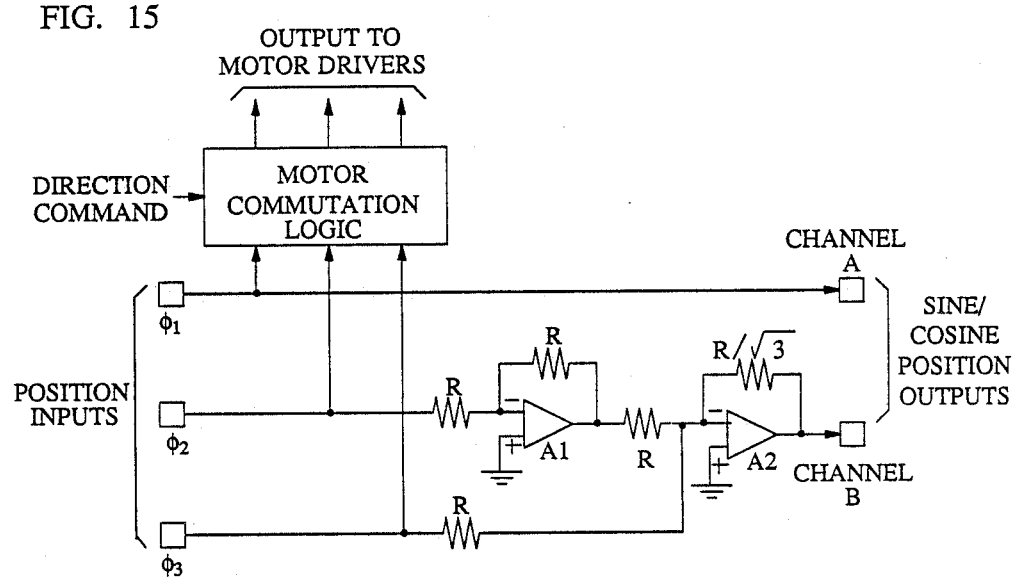
FIG. 15 is a composite diagram showing the use of the three-phase $\phi 1$, $\phi 2$, $\phi 3$ outputs to commutate a motor, together with the derivation of sine and cosine position outputs for vernier position interpolation.

While the provision of a three-phase output is particularly convenient for numbers of applications, notably multi-phase motor commutation, a two-phase sine-cosine format is often desirable in other situations. This provided in the present case by the scheme shown in FIG. 15, resulting in a standard CHAN A, CHAN B output of a type suitable to drive most commercial electronic positioning systems. (The operation of this system is analogous to that provided by the conversion from "Synchro" to "Resolver" format with magnetic systems by the use of "Scott T" transformers, except that in the present case it works down to DC.)

Figure 16:
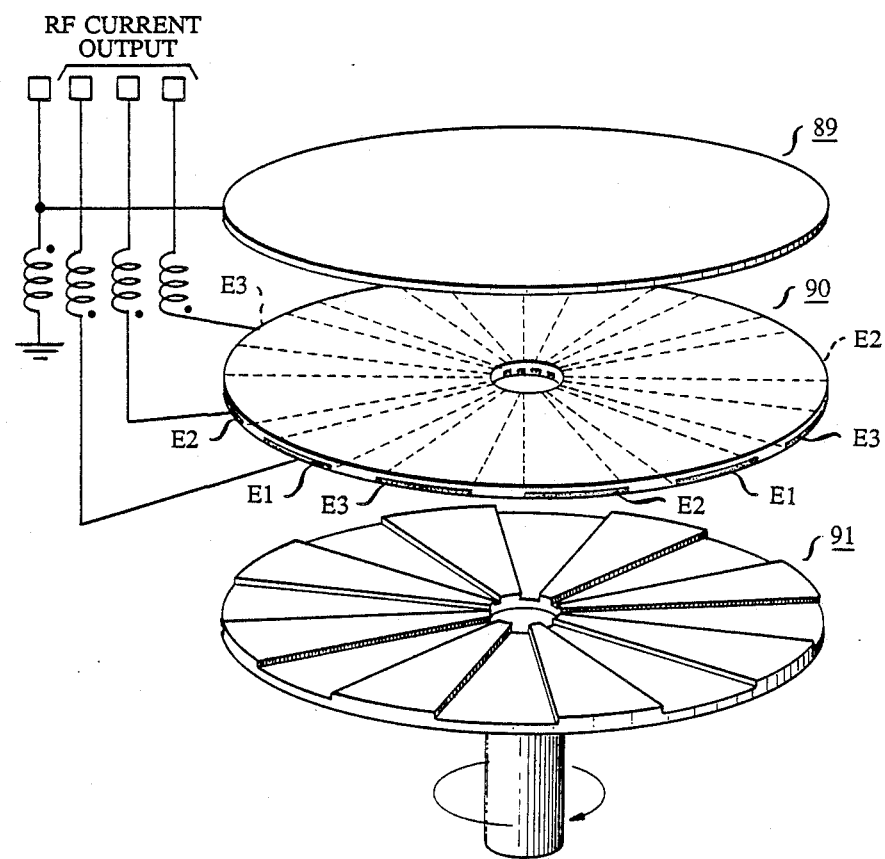
FIG. 16 is an extension of the scheme of FIG. 1 to both commutate and measure angular rotation of an 8-pole three-phase rotary motor.

While the preceding systems have been primarily developed for two-dimensional positioning applications, their use instead in one-dimensional situations is straightforward. An attractive application is that of capacitively commutated and micropositioned rotary servo motors as indicated in FIG. 16. Here, the use of the capacitive sensor system 89, 90, 91 that is shown provides for the conversion of a standard 15° stepping motor into a high resolution servo motor. It is particularly noteworthy that in such rotary applications the system automatically averages over all of the sensing electrodes all the time, thereby providing the highest possible differential linearity for such cases. The same is true for rotary capacitive sensors formed as segmented drums, instead of segmented dics of the type shown in FIG. 16.

Figure 17:
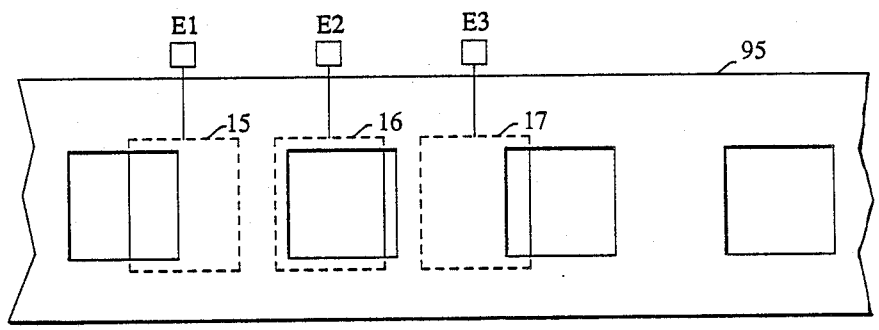
FIG. 17 is a plan view of three-phase pickup electrodes with respect to an apertured belt or tape.
Figure 18:
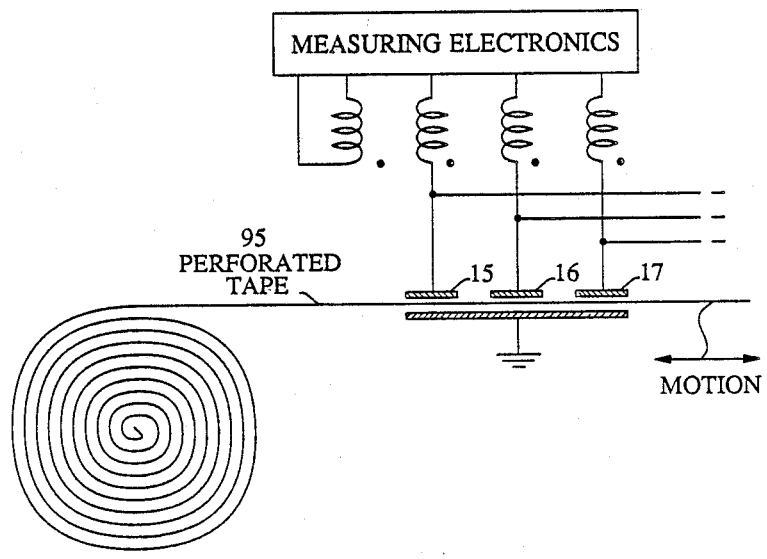
FIG. 18 is a coiled, patterned, flexible rule with interpolating distance readout, based on the use of an apertured tape.

Neither is the one-dimensional case limited to rotary situations. Purely linear applications can obviously also make use of precisely the same approach (here also no "chevron" is needed since there is no motion in a perpendicular direction). Conceptually the simplest of these applications is to employ a system essentially identical to that of FIGS. 1 and 11, except that now the sensor moves over a ground plane that only has grooves cut in one direction instead of two. By the same token, the sensor can alternatively be itself stationary and the substrate (providing the spatially modulated capacitive pattern) can take the form of a long, flexible, patterned metal (or insulating) tape 95, as shown illustratively in FIG. 17. Such a tape can be reeled up, if desired, to provide the analog of a carpenter's flexible steel rule, but with a high resolution electrical readout as shown in FIG. 18.

Figure 19:
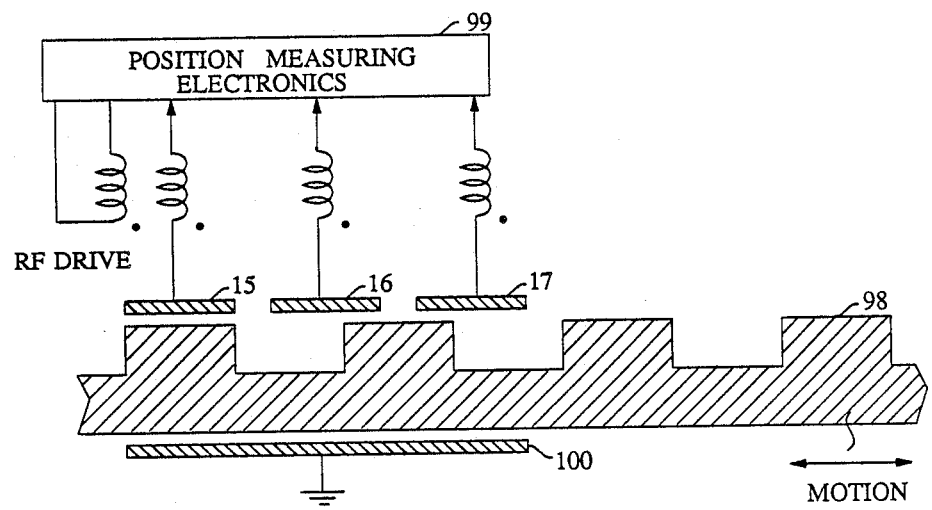
FIG. 19 is a side view of a three-phase capacitive pickup being used in conjunction with a plastic timing belt.

Another point relates to the way in which the RF currents are obtained from the position sensor. All the systems discussed so far have taken the form illustrated in FIG. 19, i.e., using a transformer drive to the sensing electrodes. This is usually the applicable method and is illustrated here in exemplary use with a plastic timing belt 98 (which doubles both as the capacitively patterned substrate and the moving element), together with the same electronics 99 as are shown in FIG. 11. It is convenient furthermore precisely to define the capacitances seen by electrodes 15, 16, 17 by using the grounded back electrode 100.

Figure 20:
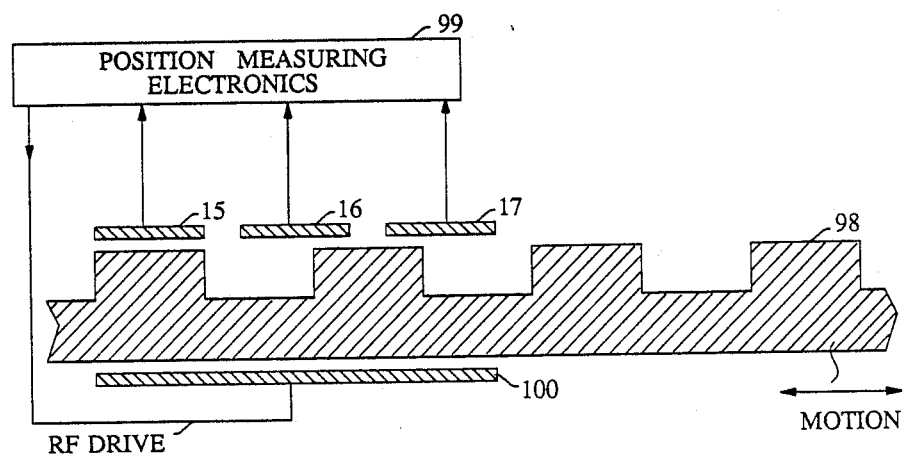
FIG. 20 is a modification of the three-phase capacitive system to employ a separate RF driving electrode mounted behind a plastic timing belt.

However, for this situation, and for a number of analogous ones that have suitable ungrounded electrodes available, the system can omit the driving transformer as shown in FIG. 20. Here, the sensing electrodes 15, 16, 17 drive the measuring electronics directly (i.e., transistors 44, 45, 46 of FIG. 10), while the servoed RF drive is applied to the backplate 100. This regime can be advantageous provided suitable electrodes are available.

Figure 21:
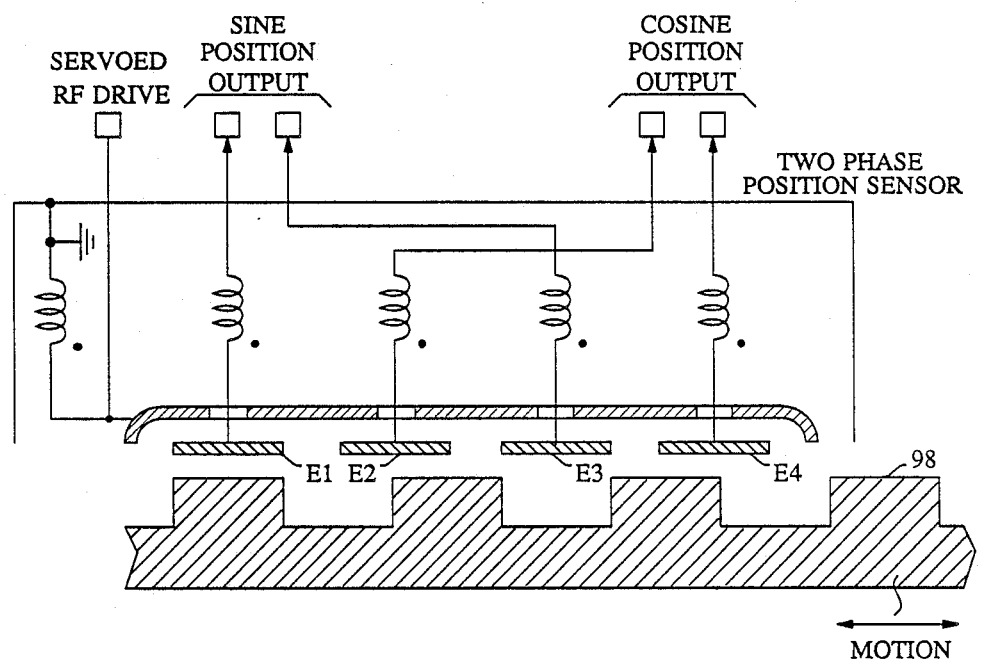
FIG. 21 shows a two-phase position sensor that employs four identical electrodes spanning three platen periods to provide sine and cosine outputs.

A final variation of the invention modifies the use of exactly three sensing electrodes E1, E2, E3 (and multiples thereof) in preference to any other number. This can be shown to be the minimum number required for unambiguous position determination, and has the additional advantage that 0°, 120°, 240° spatial outputs are convenient for commutating three-phase motors. However, other multi-phase schemes can also be employed while still using the same driving and sensing approach. Such an arrangement is shown in FIG. 21, in which a basic set of four electrodes E1, E2, E3, E4 span exactly three platen periods. (This is to be compared with FIG. 11 where three electrodes span two platen periods.) Taking the differences of the E1, E3 and E2, E4 signals then provides two output signals that are 90°0 apart in spatial phase, i.e., this system produces position signals identical to the sine and cosine outputs of FIG. 15. This can be useful in situations in which just two 90° output are required.

What is claimed is:

1. A capacitive position-sensing system of the type comprising
    a plurality of conducting elements lying essentially in a configuration defining a smooth surface;
    at least some of said elements being spaced apart in said smooth surface in a first direction in which motion is to be sensed;
    means for providing capacitive effects with respect to said elements, including
        means for forming a capacitive reference surface for said elements; and
        means for sensing differences of capacitances between the reference surface and respective ones of said elements;
    the means for providing capacitive effects with respect to said elements including
        means for establishing a spatially modulated repetitive capacitive pattern between said reference surface and said conducting elements;
    said system being characterized in that
    the forming means forms a conductively monolithic capacitive reference surface;
    the spaced apart elements are subdivided into at least three groups; and
    the sensing means simultaneously senses at least two capacitive difference signals.

2. A capacitive position-sensing system of the type claimed in claim 1,
    said system being further characterized in that
    others of said conducting elements are spaced apart in a second direction differing from said first direction; and
    the means for establishing a spatially modulated capacitive pattern is adapted to establish such a pattern uniformly repetitively in both of said first and second directions.

3. A capacitive position-sensing system of the type claimed in claim 1,
    said system being further characterized in that
    the electrodes spaced apart in the first direction have a periodicity relative to the periodicity of the means for establishing a spatially modulated repetitive capacitive pattern which is in a ratio to produce selected multi-phase signals.

4. A capacitive position-sensing system of the type claimed in claim 3,
    said system being further characterized in that
    the ratio of the periodicity of the electrodes to the periodity of the establishing means is three to two.

5. A capacitive position-sensing system of the type claimed in claim 3,
    said system being further characterized in that
    the ratio of the periodicity of the electrodes to the periodicity of the establishing means is four to three.

6. A capacitive position-sensing system of the type claimed in claim 1,
    said system being further characterized in that
    the conducting elements that are spaced apart in the first direction are interconnected in at least three interdigitated groups, and
    said sensing means includes means for driving the respective groups with voltage signals of the same amplitude and phase while separating their resultant current flows.

7. A capacitive position-sensing system of the type claimed in claim 6,
    said system being further characterized in that
    the driving means includes a transformer-coupling arrangement and an electrostatic-shielding arrangement that together tend to cancel capacitive effects other than the aforesaid capacitive effects.

8. A capacitive position-sensing system of the type claimed in claim 2,
    said system being further characterized in that
    the first-said conducting elements and the other conducting elements spaced apart in the first and second directions, respectively, have lengths of an integral number of pattern periods and in addition have periodic offsets in a sense lateral to the respective directions to yield improved independence of sensing for the respective directions of motion.

9. A capacitive position-sensing system of the type claimed in claim 8, said system being further characterized in that
the periodic offsets of the electrodes are arranged to approximate a chevron pattern.

10. A capacitive position-sensing system of the type claimed in claim 6,
said system being further characterized in that
the driving means comprises
means for indicating both lateral motion and height above the reference surface simultaneously in response to difference and sum signals, respectively, and
means for applying the sum signal to control the magnitude of the driving signal to tend to maintain the sum signal at a pre-assigned value.

11. A capacitive position-sensing system of the type claimed in claim 10,
said system being further characterized in that
the indicating means and the means for applying the sum signal to control the driving signal cooperate to generate an indication of height.

12. A capacitive position-sensing system of the type claimed in claim 2,
said system being further characterized in that
the conductive elements, particularly in regard to their lateral extent, and the spatially modulated repetitive capacitive pattern are mutually adapted to tend to average out nonuniformities of both and to provide a specified degree of differential linearity.

13. A capacitive position-sensing system of the type claimed in claim 6,
said system being further characterized in that
the driving means is adapted to operate at a frequency in the range from 100 kHz to 100 MHz.

14. A capacitive position-sensing system of the type claimed in any of claims 1, 3, 6, 12 or 13,
said system being further characterized in that
the conducting elements, the means for forming a reference surface, and the means for establishing a spatially modulated repetitive capacitive pattern are mutually adapted to sense motion with respect to an axis of rotation.

15. A capacitive position-sensing system of the type claimed in claim 14,
said system being further characterized in that
the means for forming a reference surface is adapted to form said reference surface concentrically about the axis of rotation, and at least some of the conducting elements and the means for establishing a spatially modulated repetitive capacitive pattern conform generally to surfaces concentric with said reference surface.

16. A capacitive position-sensing system of the type claimed in claim 15,
said system being further characterized in that
others of said conducting elements are spaced apart in a second direction parallel to the axis of rotation, at least said others of said elements being mounted on a cylinder free to move axially with respect to said reference surface and said means for establishing a spatially modulated repetitive capacitive pattern.

17. A capacitive position-sensing system of the type claimed in claim 14,
said system being further characterized in that
the means for forming a reference surface is adapted to form said reference surface orthogonal to the axis of rotation, and at least some of the conducting elements and the means for establishing a spatially modulated repetitive capacitive pattern conform generally to surfaces parallel to said reference surface, the conducting elements approximating truncated circular sectors.

18. A capacitive position-sensing system of the type claimed in claim 17,
said system being further characterized in that
the conducting electrodes are interconnected in interdigitated groups, and
said sensing means includes means for driving the respective groups electrically with the same amplitude and phase including
means for indicating both rotational motion and height above the reference surface simultaneously in response to difference and sum signals, respectively.

19. A capacitive position-sensing system of the type claimed in claim 1,
said system being further characterized in that
the means for establishing a spatially modulated repetitive capacitive pattern is primary composed of non-conducting material.

20. A capacitive position-sensing system of the type claimed in claim 1,
said system being further characterized in that
the means for establishing a spatially modulated repetitive capacitive pattern is composed in part of a perforated conducting member spanning a major portion of a surface between the conducting elements and the reference surface, which itself is defined in major part by another conducting member.

21. A capacitive position-sensing system of the type claimed in claim 20,
said system being further characterized in that
the means for providing capacitive effects with respect to said elements includes
means for maintaining potential differences among the conducting elements as a group, the perforated conducting member and the other conducting member in a manner selected to minimize spurious capacitive effects.

22. A capacitive position-sensing system of the type claimed in claim 21,
said system being further characterized in that
said perforated conducting member is movable with respect to said conducting elements and said other conducting member.

23. A capacitive position-sensing system of the type claimed in claim 1,
said system being further characterized in that
the means for establishing a spatially modulated repetitive capacitive pattern is composed in part of a patterned dielectric member spanning a major portion of a surface between the conducting elements and the reference surface.

24. A capacitive positioning-sensing system of the type claimed in claim 23
said system being further characterized in that
said patterned dielectric member is movable with respect to said conducting elements and said reference surface.

25. A capacitive position-sensing system of the type claimed in claim 1,
said system being further characterized in that
the system includes means for applying a voltage signal to at least one of the conducting elements and monitoring the resultant current flow, and means for applying the difference of the peak current flow from a reference value to indicate the deviation of said element from a reference separation from the capacitance reference surface, including means for integrating the difference to modify proportionally the voltage signal and to indicate proportionally said deviation.

26. A system of the type comprising a plurality of conducting elements lying essentially in a configuration defining a smooth surface;

at least some of said elements being spaced apart in said smooth surface in a first direction;

means for providing capacitive effects with respect to said elements, including means for forming a capacitive reference surface for said elements; and means for sensing differences of capacitances between the reference surface and respective ones of said elements;

the means for providing capacitive effects with respect to said elements including means for establishing a spatially modulated repetitive capacitive pattern between said reference surface and said conducting elements; said system being characterized in that the forming means forms a conductively monolithic capacitive reference surface;

the spaced apart elements are subdivided into at least three groups and the sensing means simultaneously senses at least two capacitive difference signals.

27. A system of the type claimed in claim 26,
said system being further characterized in that
the conducting elements are spaced apart in the first direction are interconnected in interdigitated groups, and
said sensing means includes means for driving the respective groups with voltage signals of the same amplitude and phase while separating their resultant current flows.

28. A system of the type claimed in claim 27,
said system being further characterized in that
the driving means includes a multifilar transformer-coupling arrangement.

29. A system of the type claimed in claim 27,
said system being further characterized in that
the driving means comprises
means for generating both sum and difference signals, with respect to all peak current flows, and
means for utilizing the sum and difference signals.

* * * * *